(12) United States Patent
Ueno et al.

(10) Patent No.: US 10,158,240 B2
(45) Date of Patent: Dec. 18, 2018

(54) ELECTRICAL STORAGE DEVICE AND WIRELESS SYSTEM

(71) Applicant: Kabushiki Kaisha Toshiba, Minato-ku (JP)

(72) Inventors: Takeshi Ueno, Kawasaki (JP); Toshiyuki Umeda, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 142 days.

(21) Appl. No.: 15/212,481

(22) Filed: Jul. 18, 2016

(65) Prior Publication Data

US 2017/0033577 A1 Feb. 2, 2017

(30) Foreign Application Priority Data

Jul. 29, 2015 (JP) .................. 2015-149892

(51) Int. Cl.
*H02J 7/00* (2006.01)
*H02J 7/34* (2006.01)
(52) U.S. Cl.
CPC ............ *H02J 7/0029* (2013.01); *H02J 7/008* (2013.01); *H02J 7/345* (2013.01); *H02J 2007/004* (2013.01); *H02J 2007/0037* (2013.01)
(58) Field of Classification Search
USPC ......................................................... 320/166
See application file for complete search history.

(56) References Cited

U.S. PATENT DOCUMENTS

| | | | |
|---|---|---|---|
| 2012/0206101 A1* | 8/2012 | Shilimkar | H02J 7/0011 320/112 |
| 2015/0008872 A1 | 1/2015 | Fujimori et al. | |

FOREIGN PATENT DOCUMENTS

| | | |
|---|---|---|
| GB | 2 159 351 A | 11/1985 |
| JP | S60-249821 A | 12/1985 |
| JP | 2000-217267 A | 8/2000 |
| JP | 2005-354824 A | 12/2005 |
| JP | 2012-152059 A | 8/2012 |
| JP | 2015-15848 | 1/2015 |

* cited by examiner

*Primary Examiner* — Samuel Berhanu
(74) *Attorney, Agent, or Firm* — Oblon, McClelland, Maier & Neustadt, L.L.P.

(57) ABSTRACT

An electrical storage device according to an embodiment includes a power generator; a first-type capacitor that stores the electrical power generated by the power generator; second-type capacitors that are connected to the first-type capacitor in parallel; switches each of which is connected to one of the second-type capacitors; and a control circuit that controls the switches. Every time either a charging voltage or an observation voltage proportional to the charging voltage exceeds a first threshold value, the control circuit controls the switches in such a way that the i+1-th second-type capacitor (where i is an integer equal to or greater than zero) is additionally connected to the first-type capacitor in parallel.

11 Claims, 5 Drawing Sheets

ELECTRICAL STORAGE DEVICE AND WIRELESS SYSTEM

CROSS-REFERENCE TO RELATED APPLICATIONS

This application is based upon and claims the benefit of priority from Japanese Patent Application No. 2015-149892, filed on Jul. 29, 2015; the entire contents of which are incorporated herein by reference.

FIELD

Embodiments described herein relate generally to an electrical storage device and a wireless system.

BACKGROUND

In the energy harvesting technology in which weak environmental energy is converted into electrical energy using electricity generating elements such as photovoltaic cells, thermoelectric generation elements, or piezoelectric elements; the electrical power output by the electricity-generating elements fluctuates in a major way depending on the environmental conditions. In that regard, typically, in order to buffer the fluctuation in electrical power attributed to the environmental conditions, the electricity-generating elements are configured to temporarily store the electrical power in capacitance. Moreover, with the aim of enhancing the electricity storing efficiency and using the stored electrical energy in an efficient manner, the configuration is done to monitor the electricity generating capacity of the electricity generating elements and to monitor the remaining amount of stored electricity in the capacitance.

DETAILED DESCRIPTION

Exemplary embodiments of an electrical storage device and a wireless system are described below in detail with reference to the accompanying drawings.

First Embodiment

Figure 1:
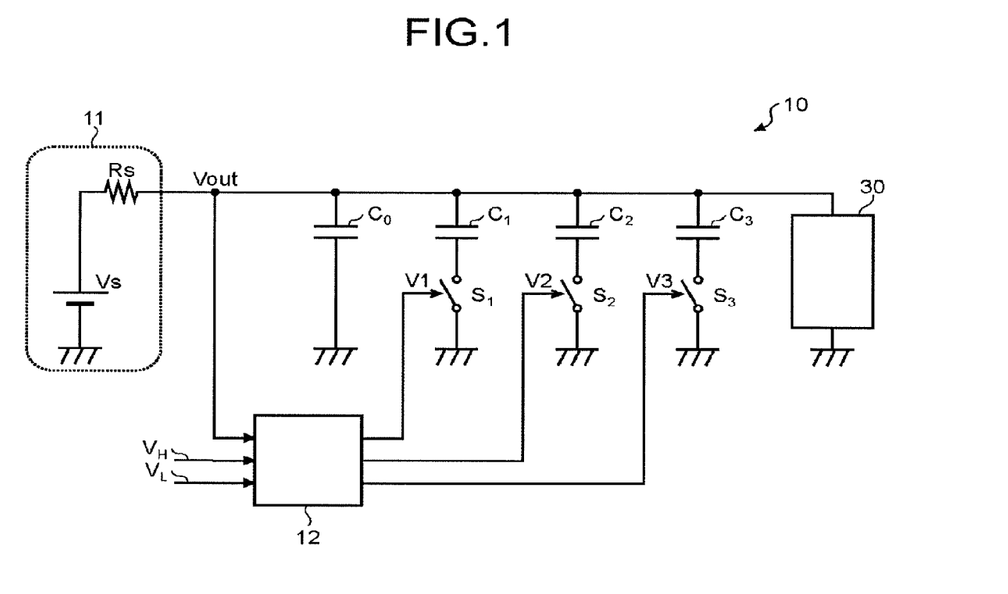
FIG. 1 is a circuit diagram illustrating an exemplary schematic configuration of an electrical storage device according to a first embodiment.

FIG. 1 is a circuit diagram illustrating an exemplary schematic configuration of an electrical storage device according to a first embodiment. As illustrated in FIG. 1, an electrical storage device 10 includes a power generator 11, a plurality of capacitors $C_0$ to $C_3$, a plurality of switches $S_1$ to $S_3$, and a control circuit 12. The capacitors $C_0$ to $C_3$ ore connected in parallel to a load 30 representing the driving target as well as to the output of the power generator 11. In the following explanation, the capacitance values of the capacitors $C_0$ to $C_3$ are also referred to as $C_0$ to $C_3$, respectively.

The power generator 11 includes an electricity generating element such as a photovoltaic cell, a thermoelectric generation element, or a piezoelectric element; and is modeled with a voltage source Vs and an output resistance Rs. The electrical power supplied from the voltage source Vs is charged into the capacitors $C_0$ to $C_3$ via the output resistance Rs, and is also used to drive the load 30.

The capacitor $C_0$ is constantly connected in between the output of the power generator 11 and the ground. The capacitors $C_1$ to $C_3$ that are connected in parallel to the capacitor $C_0$ are also connected to the ground via the switches $S_1$ to $S_3$, respectively.

The switches $S_1$ to $S_3$ are controlled by control voltages V1 to V3, respectively, that are supplied from the control circuit 12. When the control voltage V1/V2/V3 is set to be low, the switch $S_1/S_2/S_3$ switches to the OFF state. On the other hand, when the control voltage V1/V2/V3 is set to be high, the switch $S_1/S_2/S_3$ switches to the ON state. As a result of switching the switches $S_1$ to $S_3$ between the ON and OFF states, the capacitors $C_1$ to $C_3$ can be switched between the use and non-use states. With that, it becomes possible to change the capacitance value of the entire electrical storage device 10. The changing of the capacitance value of the entire electrical storage device 10 represents a configuration for achieving high-speed charging and high capacitance according to the situation and the objective.

The control circuit 12 compares a capacitor charging voltage Vout, which is output from the power generator 11, with a first threshold voltage $V_H$ and a second threshold voltage $V_L$ supplied from outside; and outputs the control voltages V1 to V3 based on the comparison result. Herein, the first threshold voltage $V_H$ is higher than the second threshold voltage $V_L$.

Figure 2:
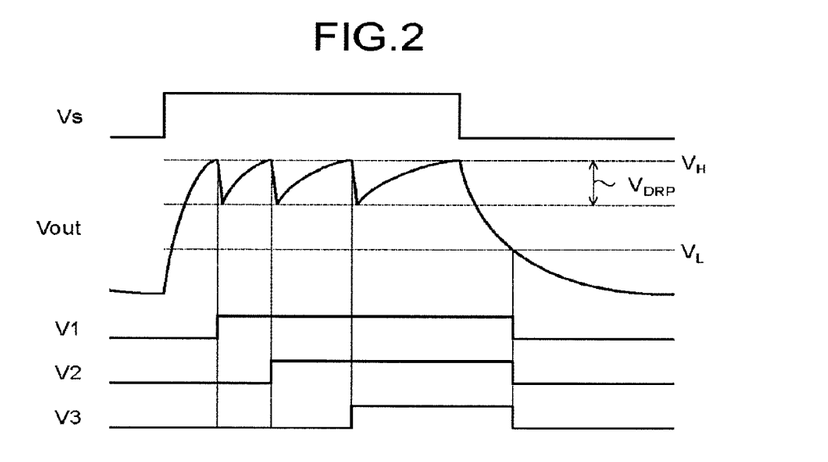
FIG. 2 is a diagram illustrating operation waveform charts of the constituent elements of the electrical storage device illustrated in FIG. 1.

In FIG. 2 are illustrated operation waveform charts of the constituent elements of the electrical storage device 10 illustrated in FIG. 1. In FIG. 2 is illustrated an example in which the electromotive force of the voltage source Vs in the power generator 11 increases from 0 V.

When the capacitor charging voltage Vout is lower than the second threshold voltage $V_L$, the control circuit 12 sets all of the control voltages V1 to V3 to be low. In that state, since the capacitor charged by the electrical power generated by the power generator 11, the capacitor charging voltage Vout rises at a fast rate.

Subsequently, when the capacitor charging voltage Vout reaches the first threshold voltage $V_H$, the control circuit 12 sets the control voltage V1 to be high. As a result, the switch $S_1$ switches from the OFF state to the ON state, and thus the capacitor $C_1$ gets connected to the capacitor $C_0$ in parallel. Once the capacitor $C_1$ gets connected in parallel, some of the load charged into the capacitor $C_0$ is transferred to the capacitor $C_1$. Consequently, the capacitor charging voltage Vout drops by a voltage fluctuation amount $V_{DRP}$ given below in Equation (1).

$$V_{DRP} = \frac{C_0}{C_0 + C_1} V_H \qquad (1)$$

Herein, when the capacitance value $C_1$ of the capacitor $C_1$ is set to be smaller than the capacitance value $C_0$ (i.e., when $C_1<C_0$ holds true), the voltage fluctuation amount $V_{DRP}$ can be held down to less than half of the first threshold voltage $V_H$ (i.e., $V_{DRP}<\frac{1}{2}\cdot V_H$ holds true). However, when the target value of the voltage fluctuation amount $V_{DRP}$ is decided in advance, the capacitance value $C_1$ of the capacitor $C_1$ can be set according to Equation given below.

$$C_1 = \frac{V_{DRP}}{V_H - V_{DRP}} C_0 \qquad (2)$$

As a result of repeatedly performing the operations described above, every time the capacitor charging voltage Vout reaches the first threshold voltage $V_H$, the capacitors $C_1$ to $C_3$ get connected, in that order, to the capacitor $C_0$ in parallel. Hence, the capacitance value of the electrical storage device 10 can be increased in a stepwise manner while keeping the voltage fluctuation amount $V_{DRP}$ to be equal to or smaller than a predetermined value.

Meanwhile, if Equation (2) is generalized to a capacitance $C_{i+1}$ of the i+1-th capacitor $C_{i+1}$ (where i is an integer equal to or greater than zero), Equation (3) given below is obtained.

$$C_{i+1} = \frac{V_{DRP}}{V_H - V_{DRP}} \sum_{j=0}^{i} C_j \qquad (3)$$

If the capacitance $C_{i+1}$ of all capacitors $C_{i+1}$ is set in such a way that Equation is satisfied, then the voltage fluctuation amount $V_{DRP}$ always remains a constant value.

Next, consider a case in which there is a decrease in the electromotive force of the voltage source Vs in the power generator 11. At that time, the capacitor charging voltage Vout drops in a gradual manner. As a result, when the capacitor charging voltage Vout reaches the second threshold voltage $V_L$, the control circuit 12 sets all of the control voltages V1 to V3 to be low. Consequently, the switches $S_1$ to $S_3$ switch to the OFF state, and the state returns to the initial state in which the capacitor $C_0$ is connected to the power generator 11.

In this way, according to the first embodiment, in the configuration for changing the capacitance value of the entire electrical storage device 10, only the capacitor charging voltage $V_{out}$ is set as the monitoring target, and there is no need to monitor each charging voltage of the plurality of capacitors. As a result, it becomes possible to reduce the power consumption for the purpose of monitoring the electricity generating capacity of the electricity generating element and the remaining amount of plural stored electricity in the capacitances. Consequently, since the power consumption of the electrical storage device 10 itself can be reduced, electrical storage can be achieved in an efficient manner. Moreover, since only the capacitor charging voltage Vout is set as the monitoring target, it becomes possible to simplify the configuration of the electrical storage device 10.

Second Embodiment

Figure 3:
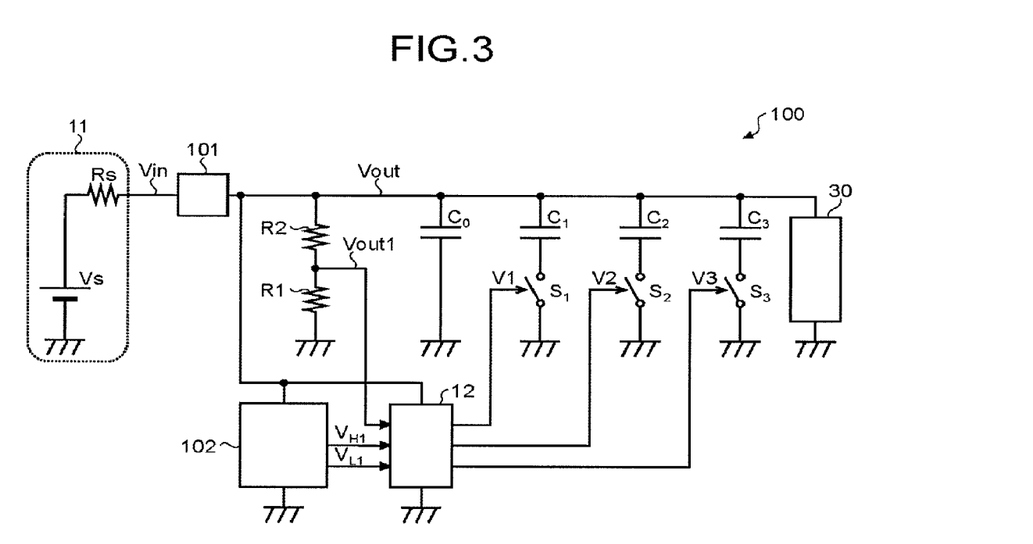
FIG. 3 is a circuit diagram illustrating an exemplary schematic configuration of an electrical storage device according to a second embodiment.

FIG. 3 is a circuit diagram illustrating an exemplary schematic configuration of an electrical storage device according to a second embodiment. As illustrated in FIG. 3, an electrical storage device 100 includes, in addition to a configuration identical to the electrical storage device 10 illustrated in FIG. 1, a step-up DC-DC converter 101, a threshold voltage generating circuit 102, and resistances R1 and R2 that divide the capacitor charging voltage Vout. In the second embodiment, the explanation is given for an example in which a thermoelectric generation element is used as the power generator 11.

In a typical thermoelectric generation element, an output voltage Vin is small in the range of few 10 mV to few 100 mV. Hence, the output voltage bin from the power generator 11 is stepped up using the step-up DC-DC converter 101.

The threshold voltage generating circuit 102 runs at the capacitor charging voltage Vout, and outputs a first threshold voltage $V_{H1}$ and a second threshold voltage $V_{L1}$ to the control circuit 12. Moreover, to the control circuit 12 are input the capacitor charging voltage Vout and an observation voltage Vout1 that is obtained when the capacitor charging voltage bout is divided by the resistances R1 and R2. Then, the control circuit 12 runs at the capacitor charging voltage bout, compares the observation voltage Vout1 with the first threshold voltage $V_{H1}$ and the second threshold voltage $V_{L1}$, and outputs the control voltages V1 to V3 according to the comparison result.

Herein, the observation voltage Vout1 can be provided using Equation (4) given below. Hence, the first threshold voltage $V_{H1}$ and the second threshold voltage $V_{L1}$ can be provided using Equations (5) and (6), respectively, from the first threshold voltage $V_H$ and the second threshold voltage $V_L$, respectively. In Equations (4) to (6), the resistance value of the resistance R1 is also referred to as R1, and the resistance value of the resistance R2 is also referred to as R2.

$$Vout1 = \frac{R1}{R1+R2} Vout \qquad (4)$$

$$V_{H1} = \frac{R1}{R1+R2} V_H \qquad (5)$$

$$V_{L1} = \frac{R1}{R1+R2} V_L \qquad (6)$$

In this way, in the second embodiment, as a result of adjusting the resistance values R1 and R2, the observation voltage Vout1 and the threshold values $H_1$ and $L_1$ can be set to arbitrary values lower than the capacitor charging voltage Vout. With that, the capacitor charging voltage Vout can be used as the driving voltage of the threshold voltage generating circuit 102 and the control circuit 12.

The remaining configuration, operations, and effects are identical to the embodiment described earlier. Hence, the detailed explanation is not repeated.

Third Embodiment

Figure 4:
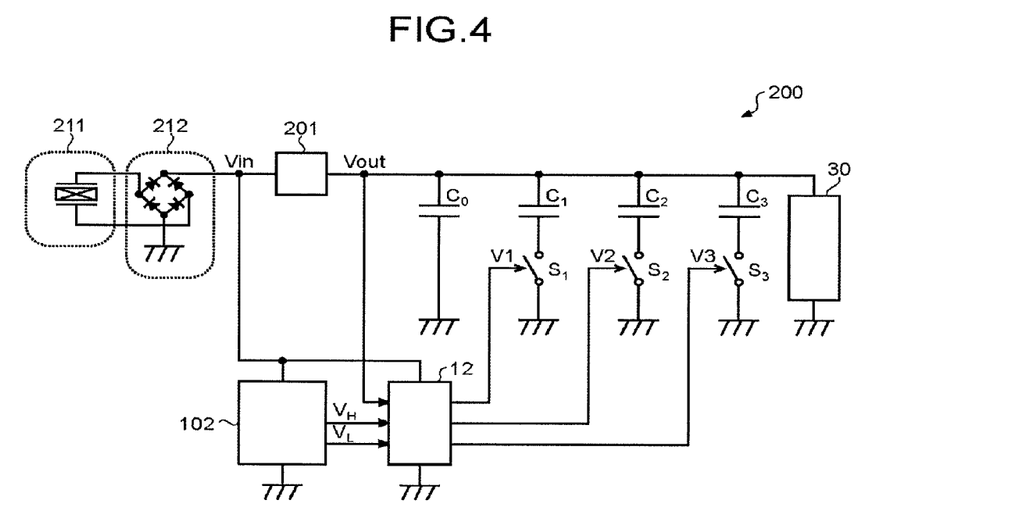
FIG. 4 is a circuit diagram illustrating an exemplary schematic configuration of an electrical storage device according to a third embodiment.

FIG. 4 is a circuit diagram illustrating an exemplary schematic configuration of an electrical storage device according to a third embodiment. As illustrated in FIG. 4, an electrical storage device 200 includes, in addition to a configuration identical to the electrical storage device 10 illustrated in FIG. 1, a rectifier circuit 212, a step-down DC-DC converter 201, and the threshold voltage generating circuit 102. In the electrical storage device 200, the explanation is given for an example in which a piezoelectric element 211 is used as the power generator 11.

In a typical piezoelectric element, the output voltage Vin is an alternating-current (AC) voltage of few 10 V. Hence, the output voltage Vin is converted into a direct-current (DC) voltage by the rectifier circuit 212, and is then stepped down using the step-down DC-DC converter 201.

The threshold voltage generating circuit 102 and the control circuit 12 are driven by the output voltage Vin of the rectifier circuit 212. In this way, since the threshold voltage generating circuit 102 and the control circuit 12 are driven by the pre-step down high output voltage Vin, the generation of the first threshold voltage $V_H$ and the second threshold voltage $V_L$ as well as the comparison of the first threshold voltage $V_H$ and the second threshold voltage $V_L$ with the capacitor charging voltage Vout can be implemented using a simple configuration.

The remaining configuration, operations, and effects are identical to the embodiments described earlier. Hence, the detailed explanation is not repeated.

Fourth Embodiment

In a fourth embodiment, the explanation is given about a more specific example of the control circuit 12 and the load 30 in the electrical storage device according to the embodiments described above.

Figure 5:
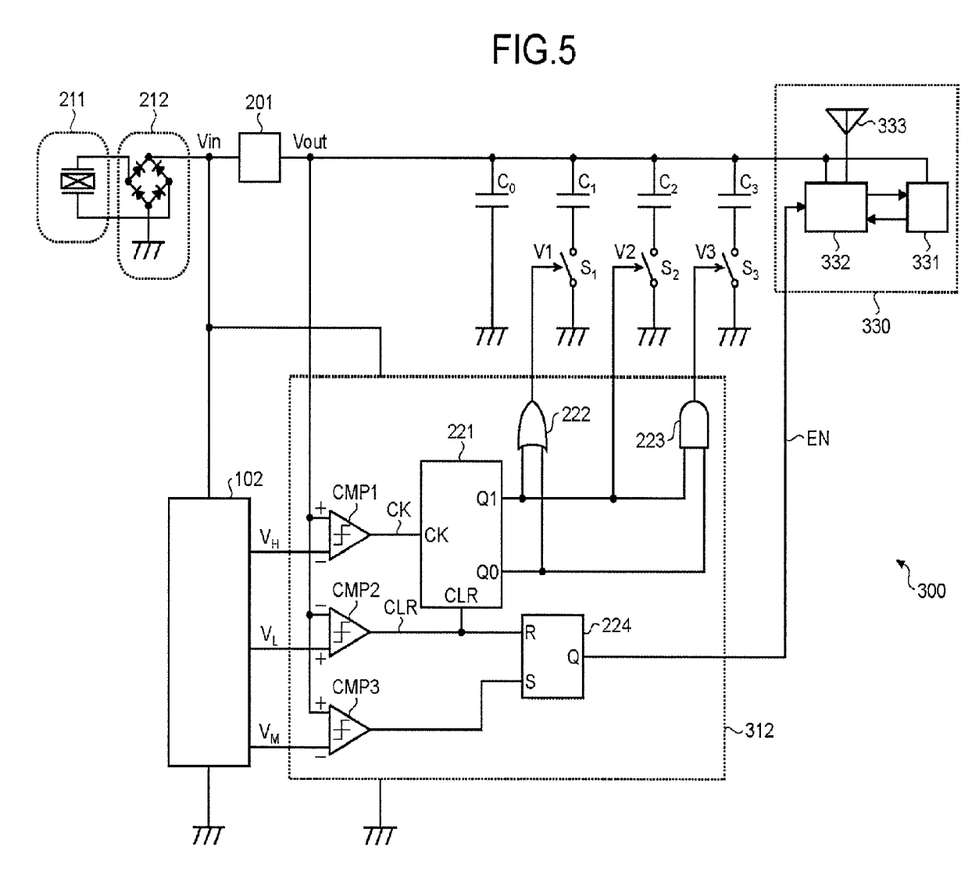
FIG. 5 is a circuit diagram illustrating an exemplary schematic configuration of an electrical storage device according to a fourth embodiment.

FIG. 5 is a circuit diagram illustrating an exemplary schematic configuration of an electrical storage device according to the fourth embodiment. As illustrated in FIG. 5, an electrical storage device 300 according to the fourth embodiment has an identical configuration to the electrical storage device 200 illustrated in FIG. 4 except for the fact that the control circuit 12 and the load 30 are replaced with a control circuit 312 and a load 330, respectively. The configuration in which the threshold voltage generating circuit 102 and the control circuit 312 are driven by the output voltage Vin is identical to the configuration of the electrical storage device 200 illustrated in FIG. 4. However, the threshold voltage generating circuit 102 according to the fourth embodiment generates, in addition to generating the first threshold voltage $V_H$ and the second threshold voltage $V_L$, a third threshold value $V_M$ that is an intermediate potential between the other two potentials.

The control circuit 312 is configured with three comparators CMP1 to CMP3, a counter 221, an OR circuit 222, an AND circuit 223, and an RS flip-flop 224.

The comparator CMP1 compares the capacitor charging voltage Vout with the first threshold voltage $V_H$, and inputs the comparison result (an output CK) to a clock terminal CK of the counter 221. The comparator CMP2 compares the capacitor charging voltage Vout with the second threshold voltage $V_L$, and inputs the comparison result (an output CLR) to a clear terminal CLR of the counter 221. Thus, every time the capacitor charging voltage Vout exceeds the first threshold voltage $V_H$, the counter 221 increases the count; and, when the capacitor charging voltage Vout falls below the second threshold value $V_L$, the counter 221 rests the count.

The comparator CMP3 compares the capacitor charging voltage Vout with the third threshold voltage $V_M$, and input the comparison result to an S input of the RS flip-flop 224. To an R input of the RS flip-flop 224 is input the comparison result obtained by the comparator CMP2. Moreover, a Q output of the RS flip-flop 224 is input as an enable signal EN to the load 330.

The load 330 is, for example, a wireless sensor made of a sensor 331, a wireless transceiver 332, and a wireless antenna 333. When the enable signal EN is input from the control circuit 312, the wireless transceiver 332 establishes a communication connection with a host (not illustrated) and sends sensor data, which is obtained from the sensor 331, to the host.

Figure 6:
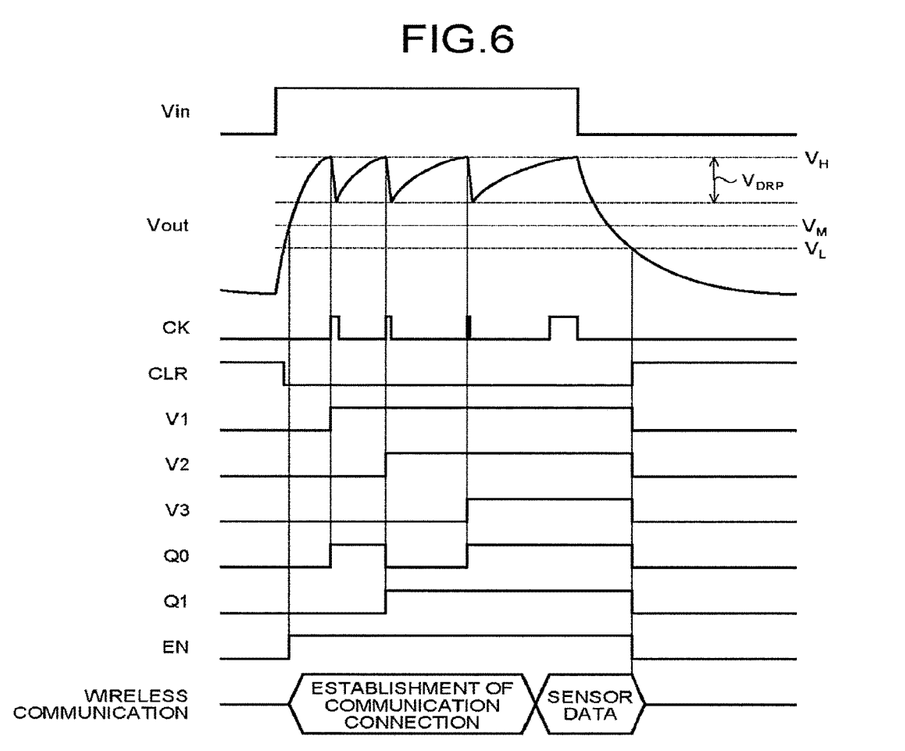
FIG. 6 is a diagram illustrating operation waveform charts of the constituent elements of the electrical storage device illustrated in FIG. 5.

In FIG. 6 are illustrated operation waveform charts of the constituent elements of the electrical storage device 300 illustrated in FIG. 5. As illustrated in FIG. 6, the operation in which, in response to the capacitor charging voltage Vout being lower than the second threshold voltage $V_L$, the control voltages V1 to V3 become low and the switches $S_1$ to $S_3$ switch to the OFF state is identical to the operation illustrated in FIG. 2 according to the first embodiment.

Meanwhile, when the output voltage Vin rises and the charging of the capacitor $C_0$ is started, the capacitor charging voltage Vout increases in a gradual manner. When the capacitor charging voltage Vout reaches the third threshold voltage $V_M$, the comparator CMP3 inputs "high" to the S input of the RS flip-flop 224. As a result, the Q output of the RS flip-flop 224 switches to "high" and the enable signal EN is input to the load 330. The input of the enable signal EN to the load 330 is continued during the period of time in which the capacitor charging voltage Vout remains greater than the second threshold voltage $V_L$.

When the capacitor charging voltage Vout further continues to rise and reaches the first threshold voltage $V_H$, the output CK from the comparator CMP1 becomes "high" and the counter increases the count. The output of the counter 221 is a 2-bit binary signal configured with Q1 and Q0, where Q1 represents the upper bit and Q0 represents the lower bit. When the output Q0 is set to "high" as a result of increase in count, the control voltage V1 also becomes "high" and thus the switch $S_1$ switches to the ON state. Thereafter, every time the output CK is set to "high", the control voltages V2 and V3 becomes "high" in that order, and thus the switches $S_2$ and $S_3$ switch to the ON state in that order.

Meanwhile, when there is a drop in the output voltage Vin, the capacitor charging voltage Vout also drops. As a result, when the capacitor charging voltage Vout becomes equal to the second threshold voltage $V_L$, the output CLR of the comparator CMP2 becomes "high" and the counter 221 is reset. Consequently, the control voltages V1 to V3 become "low" and thus the switches $S_1$ to $S_3$ switch to the OFF state.

Moreover, when the enable signal EN is input to the load 330 from the control circuit 312, the wireless transceiver 332 performs communication with a host (not illustrated) and stablishes a communication connection with the host. Once the communication connection is established, the wireless transceiver 332 outputs an enable signal EN_sense to the sensor 331. Upon receiving the enable signal EN_sense from the wireless transceiver 332, the sensor 331 starts a sensing operation and sends the obtained sensor data back to the wireless transceiver 332. Then, the wireless transceiver 332 sends the sensor data, which is received from the sensor 331, to the host.

In such a configuration, since the sensor 331 does not perform operations while the wireless transceiver 332 has established a communication connection with the host, it becomes possible to reduce the power consumption of the load 330 while the communication connection is established. As a result, it becomes possible to reduce the capacitance of the capacitor that supplies electrical power to the load 330 at the time of establishing a communication connection. Consequently, the load 330 can be activated in an expeditious manner. For example, in the state in which the switches $S_1$ to $S_3$ are switched to the OFF state, the capacitor $C_0$ can be charged at a fast rate and the load 330 can be activated. With that, for example, the operation for establishing a communication connection between the wireless transceiver 332 and the host can be started early. Moreover, while a communication connection is established between the wireless transceiver 332 and the host, the capacitors $C_1$ to $C_3$ can be additionally connected one after the other and a sufficient amount of electrical power can be stored, so as to prolong the continuous driving period of the sensor 331.

The remaining configuration, operations, and effects are identical to the embodiments described earlier. Hence, the detailed explanation is not repeated. Meanwhile, in the fourth embodiment, although the explanation given about a configuration based on the electrical storage device 200 according to the third embodiment, it is alternatively possible to base the configuration on the electrical storage device 10 or the electrical storage device 100 according to the earlier embodiments.

Fifth Embodiment

In a fifth embodiment, the explanation is given about a wireless system that is configured to generate electricity from the vibrations of an automobile engine using, for example, the electrical storage device 300 illustrated in FIG. 4.

Figure 7:
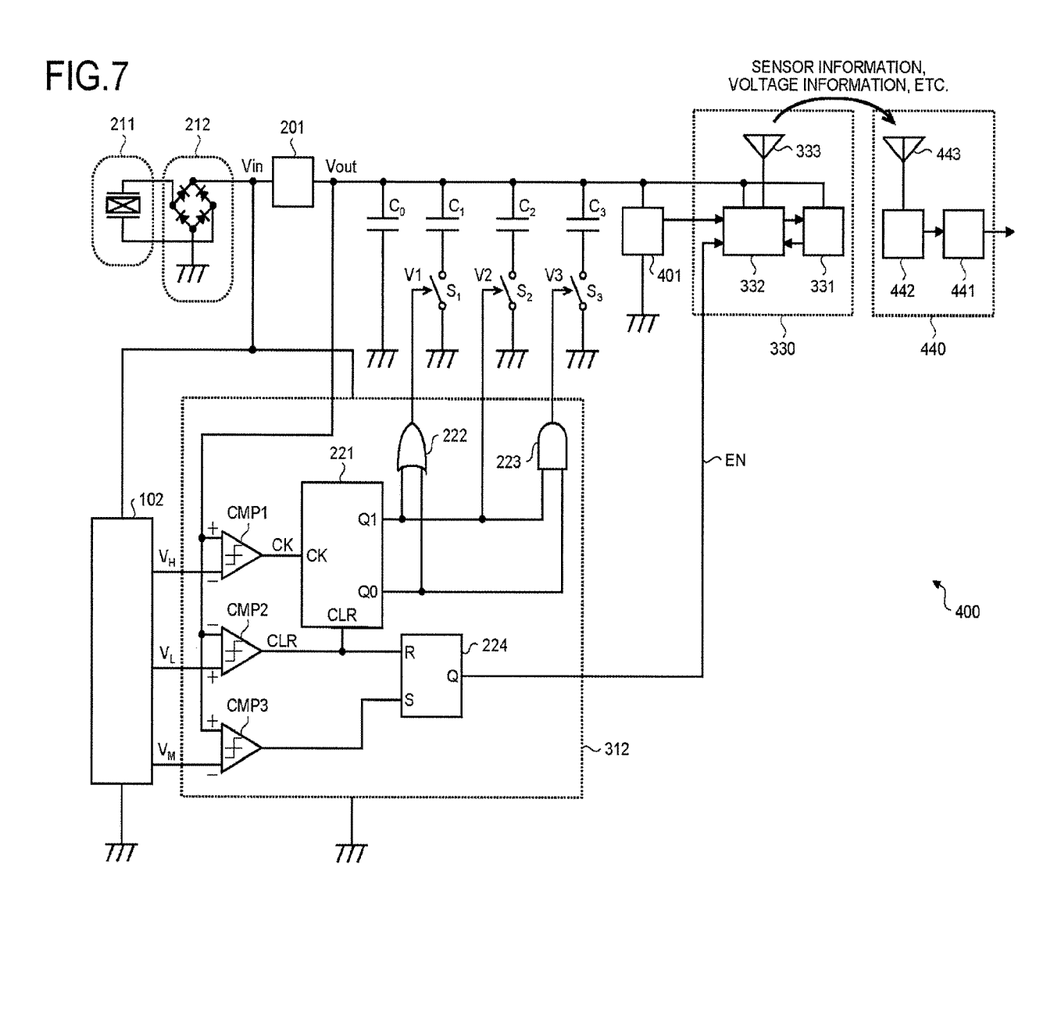
FIG. 7 is a schematic diagram illustrating an exemplary schematic configuration of a wireless system according to a fifth embodiment.

FIG. 7 is a schematic diagram illustrating an exemplary schematic configuration of the wireless system according to the fifth embodiment. As illustrated in FIG. 7, a wireless system 400 includes an electrical storage device having an identical configuration to the electrical storage device 300 illustrated in FIG. 5; a voltage monitor 401 that monitors the capacitor charging voltage Vout; the load 330 that is a wireless sensor; and a vehicle body 440 that represents the host which perform wireless communication with the load 330. The vehicle body 440 includes a wireless transceiver 442 and a wireless antenna 445 that, for example, perform wireless communication with the load 330; and an engine controller unit (ECU) 441 that controls the engine installed in the vehicle body 440.

The wireless system 400 can generate electricity as long as the engine is vibrating. However, whenever the vibrations cease due to an idling stop; the electricity generation also stops, and thus the wireless system 400 may stop performing the operations.

In that regard, in the fifth embodiment, the capacitor charging voltage Vout is monitored using the voltage monitor 401, and the obtained information of the capacitor charging voltage Vout is sent from the load 330 (the wireless sensor) to the vehicle body 440. In the vehicle body 440, the information of the capacitor charging voltage Vout is then sent from the wireless transceiver 442 to the ECU 441. Meanwhile, in the vehicle body 440, the wireless transceiver 442 and the ECU 441 are driven by a battery installed in the vehicle body 440. Hence, those constituent elements can constantly perform operations regardless of the presence or absence of vibrations. If it is determined from the input information that the capacitor charging voltage Vout has fallen below a predetermined value, the ECU 441 outputs an engine driving signal to the engine and starts idling. That leads to the generation of vibrations and the storage of electricity is started by the electrical storage system. Hence, the wireless system 400 keeps on performing operations.

In this way, according to the fifth embodiment, since the driving of the engine can be controlled based on the capacitor charging voltage Vout, it becomes possible to ensure that the wireless system 400 keeps on performing operations.

The remaining configuration, operations, and effects are identical to the embodiments described earlier. Hence, the detailed explanation is not repeated. Meanwhile, in the fifth embodiment, although the explanation is given about a configuration based on the electrical storage device 300 according to the fourth embodiment, it is alternatively possible to base the configuration on the electrical storage device 10, the electrical storage device 100, or the electrical storage device 200 according to the earlier embodiments. Moreover, in the fifth embodiment, although the explanation is given about the wireless system 400 that is installed in a vehicle, that is not the only possible case. Alternatively, the fifth embodiment can be implemented in various wireless systems that perform wireless communication using electrical energy generated from environmental energy.

While certain embodiments of the invention have been described, the embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrical storage device comprising:
a power generator that includes an electricity generating element;
a first-type capacitor that stores electrical power generated by the power generator;
n number of second-type capacitors (where n is an integer), each of which is connected to the first-type capacitor in parallel;
switches, each of which is connected to one of the second-type capacitors in series; and
a control circuit that controls the switches, wherein
every time either a charging voltage of the first-type capacitor or an observation voltage proportional to the charging voltage exceeds a first threshold value, the control circuit controls the switches in such a way that i+1-th second-type capacitor (where i is an integer equal to or greater than zero but equal to or smaller than n−1) is additionally connected to the first-type capacitor in parallel,
when $C_0$ represents capacitance value of the first-type capacitor, capacitance $C_{i+1}$ of the i+1-th second-type capacitor is set to satisfy Equation (1) given below, and
when $V_H$ represents a first threshold value and when $V_{DRP}$ represents a drop in the charging voltage attributed to additional parallel connection of the i+1-th second-type capacitor, the capacitance $C_{i+1}$ of the i+1-th second-type capacitor is set to satisfy Equation (2) given below $$C_{i+1} < \sum_{j=0}^{i} C_j \qquad (1)$$

$$C_{i+1} = \frac{V_{DRP}}{V_H - V_{DRP}} \sum_{j=0}^{i} C_j. \qquad (2)$$

2. The electrical storage device according to claim 1, further comprising a resistance that generates the observation voltage by dividing the charging voltage.

3. The electrical storage device according to claim 1, wherein, when either the charging voltage or the observation voltage falls below a second threshold voltage that is lower than the first threshold voltage, the control circuit switches all of the switches, each of which is connected to one of the second-type capacitors in series, to OFF state.

4. The electrical storage device according to claim 3, wherein,
when either the charging voltage or the observation voltage exceeds a third threshold voltage that is lower than the first threshold voltage but higher than the second threshold voltage, the control circuit sends an enable signal for allowing operations to a load which is connected to the first capacitor, and
when either the charging voltage or the observation voltage afterward falls below the second threshold voltage, the control circuit stops sending the enable signal to the load.

5. The electrical storage device according to claim 1, wherein voltage generated by the electricity generating element is direct-current voltage.

6. The electrical storage device according to claim 1, wherein
voltage generated by the electricity generating element is alternating-current voltage, and
the electrical storage device further comprises a rectifier circuit that is disposed in between the power generator and the first-type capacitor and that converts alternating-current voltage generated by the electricity generating element into direct-current voltage.

7. The electrical storage device according to claim 5, further comprising:
a converter that steps up the direct-current voltage generated by the power generator; and
a threshold voltage generating circuit that runs at the direct-current voltage which has been stepped up by the converter, and that generates the first threshold voltage, wherein
the first-type capacitor and the second-type capacitors are charged by electrical power output from the converter.

8. The electrical storage device according to claim 6, further comprising:
a converter that steps up the direct-current voltage obtained by conversion by the rectifier circuit; and
a threshold voltage generating circuit that runs at the direct-current voltage which has been stepped up by the converter, and that generates the first threshold voltage, wherein
the first-type capacitor and the second-type capacitors are charged by electrical power output from the converter.

9. The electrical storage device according to claim 5, further comprising:
a converter that steps down the direct-current voltage generated by the power generator; and
a threshold voltage generating circuit that runs at the direct-current voltage generated by the power generator, and that generates the first threshold voltage, wherein
the first-type capacitor and the second-type capacitors are charged by electrical power output from the converter.

10. The electrical storage device according to claim 6, further comprising:
a converter that steps down the direct-current voltage obtained by conversion by the rectifier circuit; and
a threshold voltage generating circuit that runs at the direct-current voltage generated by the power generator, and that generates the first threshold voltage, wherein
the first-type capacitor and the second-type capacitors are charged by electrical power output from the converter.

11. A wireless system comprising:
the electrical storage device according to claim 1;
a wireless sensor that is connected to the electrical storage device; and
a host that performs wireless communication with the wireless sensor.

* * * * *